Sept. 12, 1967 R. E. MIRABELLI 3,341,822
METHOD AND APPARATUS FOR TRAINING SELF-ORGANIZING NETWORKS
Filed Nov. 6, 1964

INVENTOR
RICHARD E. MIRABELLI
BY Hurvitz & Rose
ATTORNEYS

United States Patent Office 3,341,822

Patented Sept. 12, 1967

3,341,822

METHOD AND APPARATUS FOR TRAINING SELF-ORGANIZING NETWORKS

Richard E. Mirabelli, Arlington, Va., assignor to Melpar, Inc., Falls Church, Va., a corporation of Delaware Filed Nov. 6, 1964, Ser. No. 409,550
14 Claims. (Cl. 340—172.5)

ABSTRACT OF THE DISCLOSURE

Remote change of the logical function of binary input variables formed by a trainable logical network in response to training signals reflecting a desired response or objective of the network, is effected by application of a selected one of a plurality of binary digital sequences, each representative of a different logical function of the $n$ input variables to which the network is responsive at any given instant, as the binary input variables to the network. A training signal generator is provided for comparing the value of the network output function generated in response to the set of $n$ input bits in a specific order of binary values in the applied sequence, to the binary value of a bit located in a specific position following that order of values in the sequence. The value of the specifically positioned bit relative to the aforementioned order of values over a number of repetitions of that order has a majority of one binary value or the other, the value in the majority selected to produce the desired network response to that set of input bits.

The present invention relates generally to networks capable of synthesizing, or being organized or trained to form, any of a plurality of binary functions; and more particularly to a method and apparatus for training such a network to organize itself to a desired logical function in response to sequences of binary bits.

In the co-pending applications of Robert J. Lee, Ser. No. 160,965, filed Sept. 14, 1961 for "Self Synthesizing Machines" and Peter H. Halpern, Ser. No. 170,059, filed Jan. 31, 1962 for "Generalized Self-Synthesizer," now U.S. Patent 3,262,101, granted July 19, 1966, there are disclosed systems whereby logical networks can be organized to synthesize any one of a plurality of binary Boolean functions. The systems of said applications have, as a common feature, the derivation of the minterm products of the network binary input signals. (The minterm products of $a$ and $b$, for example, are $ab$, $\bar{a}b$, $a\bar{b}$ and $\bar{a}\bar{b}$.) The minterm products are selectively gated through a statistical switch that initially has equal probability of passing or blocking its input. The statistical switch output is compared with the response elicited from a goal circuit for the particular combination of input signals to derive reward and punish signals for the switch. If the desired and actual response of the system are alike, the switch is rewarded, i.e., is driven to more likely be in the state that caused the correct response when the input combination is repeated. The opposite effect on the statistical switch is obtained if the actual and desired responses are different.

A difficulty with the prior art devices is that the goal circuit is at the same site as the logical network, hence is frequently inaccessible in the event of malfunction or a necessity in changing the Boolean function arises.

The present invention overcomes this difficulty by arranging the synthesizer network to be responsive to sequences of binary bits. Every bit is sequentially applied to the network input terminals once during each sequence and is also applied, as a desired response indication, to one input of a comparator that controls the statistical switch in a manner similar to that disclosed in the aforementioned applications of Lee and Halpern. The bits, which may be transmitted from a site remote from the network, are arranged in value and position to train the network to a particular Boolean function.

Because it is usually required to train the statistical switches associated with all the minterm products, it is frequently necessary, in order to enable the sequence to derive all the minterms, to provide different desired response bits for the same combination of input terminal bits. Under such conditions, the majority of response bits for the same combination of input bits controls the state of a particular statistical switch.

Another feature of the present invention is that the network can be accurately trained even if a noisy communication link exists between the two sites. If the link is noisy, repeating the same sequence eventually activates the switches into their desired states. This is because the switches are controlled in response to a majority of the comparisons between the received desired bits and the network output bits. In the alternative, control over a noisy link can be established by redundantly deriving, in a single sequence, the same desired bit for the same combination of input terminal bits.

It is, accordingly, an object of the present invention to provide a network capable of synthesizing one of a plurality of Boolean algebra functions in response to a signal derived externally of the network.

Another object of the invention is to provide a new and improved method of and apparatus for synthesizing a network capable of being trained to one of a plurality of Boolean algebra functions.

An additional object of the invention is to provide a sequencer for deriving signals that enable a network to be trained to one of a plurality of Boolean algebra functions.

A further object of the invention is to provide a method of and apparatus for accurately training, from a remote location, a network to a Boolean algebra function even though a noisy communication link exists between the network and remote locations.

The above and still further objects, features and advantages of the present invention will become apparent upon consideration of the following detailed description of one specific embodiment thereof, especially when taken in conjunction with the accompanying drawings, wherein.

Figure 1:
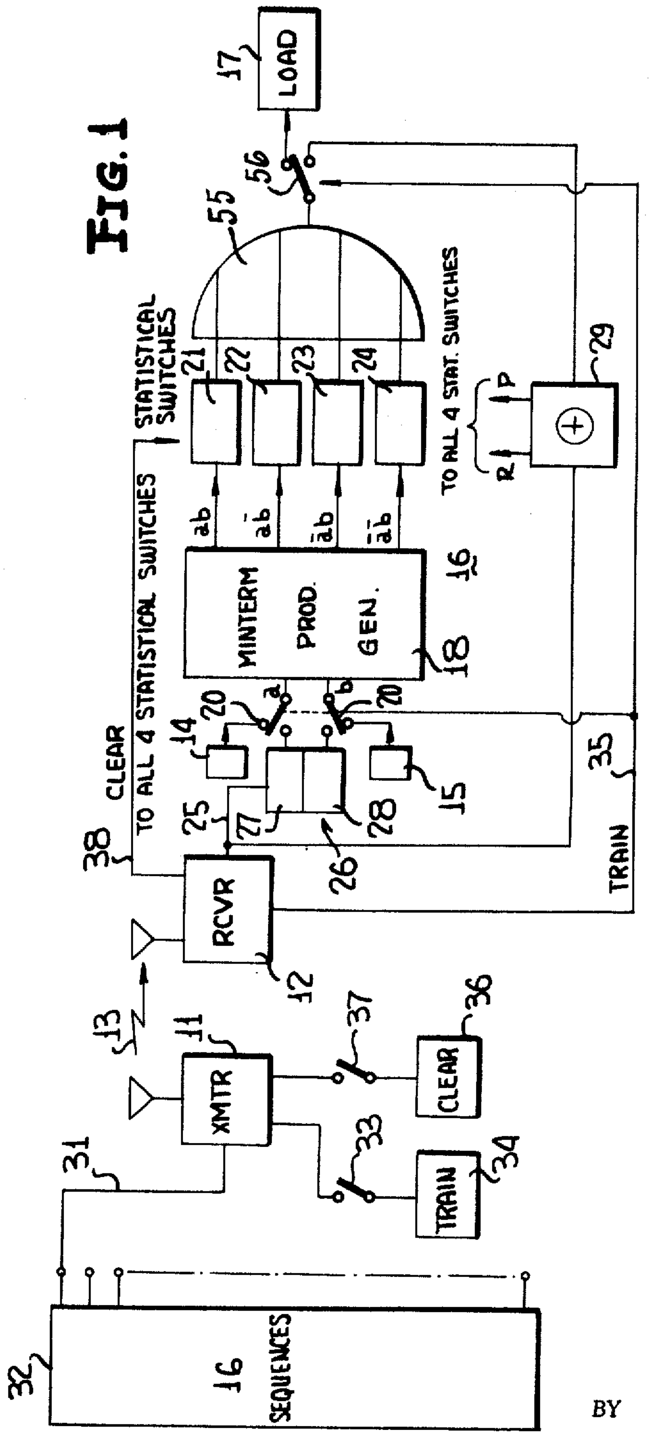
FIGURE 1 is a block diagram of a preferred embodiment of the invention.

Reference is now made to FIGURE 1 of the drawings wherein remotely located transmitter 11 and receiver 12 are coupled together via radio link 13. At the site of receiver 12, a pair of binary signal sources 14 and 15 normally feed signals ($a$ and $b$) through network 16 to load 17. Network 16 is capable of being organized to form any of the sixteen Boolean functions of two variables so that the input to load 17 is any one of:

TABLE I

| | | | |
|---|---|---|---|
| (1) | $a$ | (9) | $ab+\bar{a}\bar{b}$ |
| (2) | $b$ | (10) | $\bar{a}b+a\bar{b}$ |
| (3) | $ab$ | (11) | $\bar{a}\bar{b}+b$ |
| (4) | $\bar{a}b$ | (12) | $a\bar{b}+b$ |
| (5) | $a\bar{b}$ | (13) | $a+\bar{a}b$ |
| (6) | $\bar{a}\bar{b}$ | (14) | $a+\bar{a}\bar{b}$ |
| (7) | $\bar{a}$ | (15) | 1 |
| (8) | $\bar{b}$ | (16) | 0 |

Network 16 comprises ganged switches 20 for normally feeding binary sources 14 and 15 to separate inputs of minterm product generator 18, which preferably takes a form taught in said application of Peter H. Halpern. Generator 18 simultaneously derives binary signals indicative of the four minterm or canonical products $ab$, $\bar{a}b$, $a\bar{b}$ and $\bar{a}\bar{b}$, of its two binary inputs. The minterm products, only one of which can be a binary one for any particular pair of input values, are selectively gated through statistical switches 21–24. Switches 21–24 may be of the type disclosed in the aforementioned application of Halpern assigned to the same assignee as the present invention. Switches 21–24, once trained, are always open to pass signal, or closed to block it, depending upon the particular function to which network 16 is trained. The binary outputs of switches 21–24 are normally coupled through OR gate 55 to load 17 via switch 56 that is ganged with switches 20.

The present invention provides a means and method for controlling, at the site of transmitter 11, which one of the sixteen functions enumerated in Table I is selected as the logical function between sources 14, 15 and load 17. To accomplish this result, two stage shift register 26 is connected between the binary decoding output 25 of receiver 12 and the normally open circuited contacts of switches 20. The first and second stages 27 and 28, respectively, of shift register 26 are connected to the "*a*" and "*b*" inputs of minterm product generator 18 via switches 20 when the latter are activated. As binary signals are derived in sequence by receiver 12 on lead 25, they cause the contents of shift register 26 to be stepped so that $a(t)=b(t+1)$, i.e. the "*a*" input of generator 18 at time $t=1$ is the same as the "*b*" input at time $t=2$, where $t=1$ is the duration between adjacent binary bits deriving from receiver 12.

Output 25 of receiver 12, in addition to being coupled to shift register 26, is fed to one input of comparison network 29, that can be a binary half adder. Thus, one input to network 29 is represented by $w(t)=a(t-1)$, i.e. the input to comparator 29 from receiver 12 is the same sequence applied to the "*a*" input of generator 18, but one binary bit advanced in time. The other input of half adder 29 is coupled from OR gate 55 through switch 56, when the latter is activated. When the binary signals applied to both inputs of half adder 29 are of like value, a reward signal is applied in parallel to each of statistical switches 21–24, while a punish signal is applied to switches 21–24 when the comparator inputs are different.

The only statistical switch affected by the reward and punish signal deriving from comparator 29 at any particular time is the one having a binary one applied to it when the comparison was being made. Switches 21–24 are designed to cooperate with comparator 29 so that the reward signals drive them into an open condition (to pass signal) if a particular minterm product is required to satisfy the desired Boolean function while the punish signals have the opposite effect when a particular minterm product is not required to satisfy the Boolean relationship.

Each of switches 21–24 includes a bi-directional counter, responsive to the reward and punish signals deriving from comparator 29, as well as a gate for selectively passing its minterm product. Initially, the gate has a 0.5 probability of passing its minterm product. If the gate passes its binary one minterm input and a reward is derived by half adder 29, the gate is biased to an open, i.e. signal passing, condition and the counter is activated from its zero to its first state.

The second application of a binary one minterm to the particular switch must be passed by the switch to OR gate 55. The resulting application of a binary one by lead 25 to comparator 29 results in the switch counter being driven to its second state. The counter is returned to its first state by a punish signal from comparator 29 if lead 25 supplies a binary zero to the comparator when the statistical switch is next fed with a binary one. The switch, however, remains open to pass signal because it has not been returned to its zero state.

If it is now assumed that the counter is set to zero and the gate passes its binary one input but a punish is derived by comparator 29, the gate condition is switched to a closed condition, whereby the binary one input cannot be passed. Because the counter is in the zero state, its condition advances to the first state, despite the derivation of a punish signal by half adder 29. When the next binary one minterm product is applied to the statistical switch, the gate must be closed to block coupling of a binary one by OR gate 55 to comparator 29. With a binary zero now applied by lead 25 to comparator 29, a reward advances the bi-directional counter to its second state. The counter is returned to its first state by a punish signal from comparator 29 if lead 25 supplies a binary one to the comparator while a binary one input is supplied to the statistical switch. Because the gate has been previously closed to block signal passage and the bi-directional counter is not in the zero state, OR gate 55 supplies a binary zero input to comparator 29, resulting in the punish signal derivation. Because the counter has still not been returned to its zero state, the statistical switch gate remains closed.

Transmitter 11 is provided with three inputs, one for controlling the binary sequences transmitted via link 13 and the other two for controlling operating modes at receiver 12. The first named input for transmitter 11 is selectively derived via switch 31 from one of the sixteen outputs of sequencer 32. Sequencer 32 includes means for generating sixteen separate binary bit sequences that range in length from four to eighteen bits. Each sequence is capable of training network 16 to a different one of its Boolean functions in accordance with:

TABLE II

| | Sequence | Logical function $f$ |
|---|---|---|
| #1 | 1100 | $a\bar{b}+\bar{a}\bar{b}=\bar{b}$ |
| #2 | 110000 | $a\bar{b}$ |
| #3 | 110010010 | $\bar{a}\bar{b}$ |
| #4 | 110000100010 | 0 |
| #5 | 1101101100 | $\bar{a}b+a\bar{b}+\bar{a}\bar{b}=\bar{a}b+\bar{b}$ |
| #6 | 11010100 | $\bar{a}b+\bar{a}\bar{b}=\bar{a}$ |
| #7 | 110110110000 | $\bar{a}b+a\bar{b}$ |
| #8 | 1101010000 | $\bar{a}b$ |
| #9 | 111100 | $ab+a\bar{b}+\bar{a}\bar{b}=a+\bar{a}\bar{b}$ |
| #10 | 11110000 | $ab+a\bar{b}=a$ |
| #11 | 11110010010 | $ab+\bar{a}\bar{b}$ |
| #12 | 11110000100010 | $ab$ |
| #13 | 1111011110111100 | 1 |
| #14 | 1111010100 | $ab+\bar{a}b+\bar{a}\bar{b}=b+\bar{a}\bar{b}$ |
| #15 | 111101111011110000 | $ab+\bar{a}b+a\bar{b}=b+a\bar{b}$ |
| #16 | 111101010000 | $ab+\bar{a}b=b$ |

If a noisy link exists between transmitter 11 and receiver 12, certain of the sequences can be modified to include redundant segments. Thus, sequences 10, 12 and 15 can be respectively modified as:

#10′=111111100000
#12′=111111000000010000010 and
#15′=1111110111111110111111100000000.

The binary bits deriving from sequencer 32 modulate the carrier of transmitter 11 by any conventional means, e.g. frequency shift key. The modulated bits are transmitted via link 13 and demodulated by receiver 12 to derive, on line 25, the same series of bits as was fed to transmitter 11.

Prior to and during activation of sequencer 32, the contacts of switch 33 between "train" source 34 and transmitter 11 are closed. Source 34 provides a voltage to transmitter 11 whereby the latter generates a sub-carrier that commands receiver 12 to derive a signal on its "train" output lead 35. The signal on lead 35 causes activation of ganged switches 20 and 56 to the position opposite that illustrated in FIGURE 1, whereby network 16 is in the training mode. After the sequence of interest has been transmitted, switch contacts 33 are open so that receiver switches 20 and 56 return to their normal condition.

Even prior to closing of switch contacts 33, transmitter 11 is momentarily coupled to a further voltage source 36 via the contacts of switch 37. The voltage of source 36 results in derivation of still another sub-carrier by transmitter 11. When this sub-carrier is detected by receiver 12 it provides an output signal on lead 38. The signal on lead 38 is applied in parallel to each of switches 21–24 to clear the switches so that they are in an untrained condition, i.e. have equal probabilities of passing or blocking their input signals.

Figure 2:
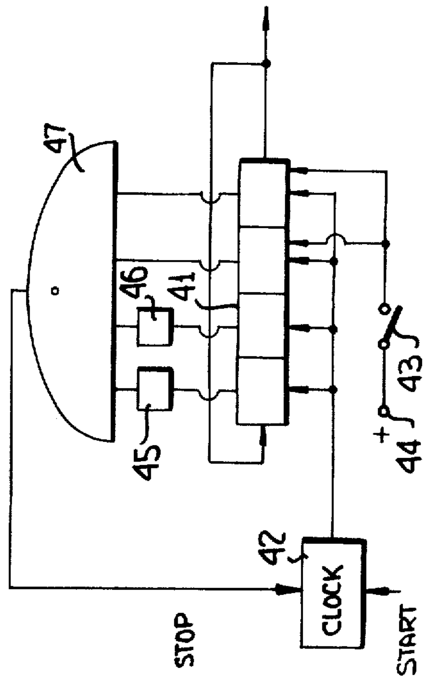
FIGURE 2 is a block diagram of one sequencer in FIGURE 1.

Reference is now made to FIGURE 2, a block diagram of an exemplary one of the 16 sequencers in unit 32. The sequencer of FIGURE 2, utilized for deriving sequence 1, Table II, comprises four stage back shift register 41, each stage of which is driven in parallel by clock source 42. The last two stages of shift register 41 are loaded with binary ones by the positive voltage at terminal 44 by closing switch 43 prior to clock 42 being coupled to the shift register. Thus, initially the four stages of shift register 41 are loaded with the binary bits 1100, whereby a binary one is derived from the last shift register stage.

In response to the first pulse from clock 42, the contents of register 41 are advanced to 1001 and a one is again derived from the last register stage. The following pulse shifts the register contents to 0011 so a binary zero is fed to transmitter 11. The sequence continues in this fashion until the shift register contains the original sequence at which time clock 42 is stopped. Clock 42 is stopped by sensing the 1100 sequence with inverters 45 and 46, responsive to the first and second shift register stages, and AND gate 47 that is fed by the inverters as well as the last two shift register stages. The output of AND gate 47 is applied to the stop input of clock 42. The stop input is overridden by the clock start input so that shift register stepping is not accidentally inhibited.

If a noisy link exists between transmitter 11 and receiver 12, the sequence may be repeated many times. This is accomplished by connecting a predetermined counter between AND gate 47 and the stop terminal of clock 42. Each AND gate 47 output steps the counter back to zero; when the counter reaches zero, a control signal is derived to stop the clock.

A pair of examples are now presented to described the manner by which the present invention enables network 16 to be trained to any particular Boolean function. Initially, the contacts of switch 37 are momentarily closed so that each of switches 21–24 is cleared and returned to its initial, zero bias state wherein there are equal probabilities of passing and blocking signal. Contacts 33 are then closed, whereby the outputs of shift register 26 are coupled to minterm product generator 18 and the output of OR gate 55 is fed to half adder 29. Switch 31 is then engaging one of the sixteen contacts of sequencer 32, depending upon what Boolean function is sought to be synthesized by network 16.

Assume that function 1, Table II, is to be synthesized. In consequence, the binary sequence 1100 is derived on lead 31, i.e. at $t_1$ and $t_1+1$, binary ones are derived, while at $t_1+2$, and $t_1+3$ binary zeros are derived. Transmitter 11 sends these binary signals to receiver 12 which demodulates them and applies them in sequence to lead 25. Once three bits have been demodulated by receiver 12, shift register stages 27 and 28 are both storing binary ones and a binary zero is applied by lead 25 to one input of comparator 29. The binary ones in stages 27 and 28 result in the derivation of a binary one only on the *ab* output of minterm generator 18.

Let it be assumed that switch 21 is open to pass the binary one *ab* output derived by generator 18. The resulting binary one deriving from OR gate 55 is compared with the binary zero on lead 25 in half adder 29. Because of the half adder inputs are different, a punish signal is derived causing only switch 21 to be biased into a closed state, whereby it does not pass its input signal to OR gate 55.

As time advances so that four bits have been demodulated by receiver 12, the first and second shift register stages 27 and 28 contain a binary zero and one, respectively, while a binary zero is on lead 25. In response to the signals in shift register 26, a binary one is derived on the $\bar{a}b$ output lead of generator 18. It is now assumed that switch 23 is closed to prevent passage of its input to the input of comparator 29, whereby the comparator input from OR gate 55 is a binary zero. Since both inputs to comparator 29 are now binary zeros, a reward signal is applied to switches 21–24. Since only switch 23 had a binary one applied to it, only that switch is rewarded by being biased to closed condition, whereby no signal is thereafter passed through it.

As time advances further so that five bits have been demodulated by receiver 12, stages 27 and 28 both contain binary zeros and a binary one is on lead 25. The resulting binary one on the $\bar{a}\bar{b}$ output of generator 18 is assumed to now be passed by switch 24 and OR gate 55 to one input of half adder 29. Since the other input to comparator 29 from lead 25 is also a binary one, switch 24 is rewarded so that it is biased to a state that always enables its input to be passed.

When the next bit is demodulated, stages 27 and 28 contain binary one and zero, respectively, while a binary one is on lead 25. The resulting binary one on the $a\bar{b}$ output lead of generator 18 is assumed to be blocked by switch 22 so that a binary zero is coupled to comparator 29 by OR gate 55. Because the two inputs of comparator 29 are different, switch 22 is punished so that its state is altered, whereby the $a\bar{b}$ signal can be passed to OR gate 55.

At the site of transmitter 11, no further outputs are derived from sequencer 32 and switch 33 is opened. Opening of switch 33 results in switches 20 and 56 being returned to their normal, illustrated positions. Because switches 22 and 24 have been trained to pass signals and switches 21 and 23 to block them, the Boolean function between *a* and *b* sources 14, 15 and load 17 is represented by $a\bar{b}+\bar{a}\bar{b}=\bar{b}$.

It is now assumed that it is desired to change the function of network 16 from $\bar{b}$ to $a\bar{b}$, function #2 of Table 2. Switches 37 and 33 at transmitter 11 are sequentially activated to clear receiver switches 21 and activate ganged switches 20 and 56, while transmitter switch 31 is activated to the contact from which the second binary sequence of 110000 is derived.

Demodulation by receiver 12 of the first three bits, 110, of the second sequence causes binary ones to be contained in both of stages 27 and 25 while a binary zero is on lead 28. This results in switch 21 being driven to its closed state, whereby the *ab* signal is not passed to OR gate 55. As time progresses and the second through fourth bits, 100, are respectively on lead 28 and in stages 27 and 25, switch 23 is activated by comparator 29 so that it does not pass its $\bar{a}b$ input.

The receiver is now advanced so that the third through fifth bits, 000, are respectively on lead 25 and in stages 27 and 28. This results in switch 24 being biased so that its $\bar{a}\bar{b}$ input cannot be passed to OR gate 55. When the following bit is demodulated, the signals on lead 25 and in stages 27, 28 are all again binary zeros. Since switch 24 was previously set to a position that blocks the derivation of binary ones, both inputs to comparator 29 must now be the same. In consequence, switch 24 is rewarded. Reward of switch 24 drives its bi-directional counter to the second state.

Demodulation of the following bit results in stages 27 and 28 containing binary zeros and lead 25 carrying a binary one. Again, switch 24 blocks the application of a binary one by OR gate 55 to comparator 29. Since the other comparator input is now a binary one, switch 24 is punished to drive its bi-directional counter to stage one. With the counter of switch 24 still at stage one, the switch gate remains closed to prevent passage of the $\bar{a}\bar{b}$ signal to OR gate 55.

It is thus seen that the state of switch 24 is controlled by the majority of binary signals on lead 25 at the time stages 27 and 28 both contain binary zeros. Since two binary zeros and a one binary one appeared on lead 25 at the time stages 27 and 28 both contained binary zeros, switch 23 is now closed to prevent passage of binary one signals to OR gate 55.

As sequence two continues to the next bit, stages 27, 28 are respectively loaded with a binary one and zero while lead 25 carries a binary one. This results in switch 22 being opened to allow passage of the $a\bar{b}$ minterm to OR gate 55. No further sequences are demodulated by receiver 12 which is now switched from the training state to the operating state in response to switch contacts 33 being opened. Network 16 is now synthesized to the function $a\bar{b}$ since switches 21, 23 and 24 block the $ab$, $\bar{a}b$ and $\bar{a}\bar{b}$ minterms while switch 22 passes the $a\bar{b}$ minterm.

In a manner similar to that described for the two examples given, each of the other sequences in Table II trains network 16 to any one of the fourteen other Boolean combinations of $a$ and $b$.

While I have described and illustrated one specific embodiment of my invention, it will be clear that variations of the details of construction which are specifically illustrated and described may be resorted to without departing from the true spirit and scope of the invention as defined in the appended claims. For example, the principles of the invention are applicable with generalized self organizing networks having more than two inputs, as disclosed in said co-pending application of Peter H. Halpern. If a three input self organizing device is provided, the sequence 1100000111110100100011 trains the network to synthesize the function $$a=abc+ab\bar{c}+a\bar{b}c+a\bar{b}\bar{c}$$

assuming $$b(t)=a(t+1),\ c(t)=a(t+2) \text{ and } w(t)=a(t-1)$$

According to another modification of the invention, the answer and control bits $w(t)$ and $b(t)$, respectively, need not be located adjacent to control bit $a(t)$. Thus, $w(t)$ can be $a(t-2)$ instead of $a(t-1)$, while $b(t)$ can be $a(t+2)$ instead of $a(t+1)$.

Generalizing, a network having $n$ inputs $a(t)$, $b(t)$, $c(t) \ldots n(t)$ can be trained or synthesized to any desired function by deriving a sequence of binary bits such that $b(t)=a(t+t_1)$, $c(t)=a(t+t_2) \ldots n(t)=a(t+t_n)$ and the desired value of the network response $w(t)=a(t+t_w)$, where $t_1$, $t_2 \ldots t_n$ and $t_w$ indicate bit positions removed from $a(t)$. In the sequence, the same values of $a(t)$, $b(t)$, $c(t) \ldots n(t)$ may appear more than once, with differing values of $w(t)$ for the same values of $a(t)$, $b(t)$, $c(t) \ldots n(t)$. In that event, the value of $w(t)$ in the majority for the same values of $a(t)$, $b(t)$, $c(t) \ldots n(t)$ is the actual desired system response.

I claim:

1. Apparatus for training a binary logic network to form a desired logical function in response to a predetermined sequence of binary bits, $a(t)$, $b(t)$, $\ldots i(t) \ldots n(t) \ldots w(t)$ such that $b(t)=a(t+t_1) \ldots i(t)=a(t+t_i)$, $n(t)=a(t+t_n) \ldots w(t)=a(t+t_w)$ where $t_1 \ldots t_i \ldots t_n \ldots t_w$ indicate bit positions removed from $a(t)$, said sequence being such that the binary value of $w(t)$ in the majority for repetitions of any particular $a(t)$, $b(t) \ldots n(t)$ is the actual desired response of the network for the particular values of $a(t)$, $b(t) \ldots n(t)$ and that a majority of $w(t)$ of one or the other binary value always exists, comprising $n$ input terminals, means for sequentially applying every bit in said sequence to each of said $n$ input terminals, where $n$ is greater than one, such that at a given instant of time the sequence of bits $a(t)$, $b(t) \ldots n(t)$ is concurrently applied to respective ones of all $n$ of said input terminals, means responsive to the bits at said input terminals for deriving signals indicative of the canonical products thereof, switch means having a plurality of states of being closed or open, and responsive to said canonical products for passage or blockage thereof according to the respective present state of said switch means, and means for controlling the state of said switch means in response to a comparison between the binary value derived from the output of said switch means and the binary value of $w(t)$.

2. The apparatus of claim 1 wherein said switch means for each canonical product initially has an equal probability of passing and blocking its canonical product and is biased toward a final state of being opened or closed to pass or block its canonical product in accordance with the majority of the comparisons between $w(t)$ and the switch means output for said canonical product indicative of identity or lack of identity therebetween.

3. The apparatus of claim 1 wherein $n=2$, $t_1$ is the bit position subsequently adjacent to $a(t)$ and $t_w$ is the bit position prior and adjacent to $a(t)$.

4. Apparatus for training a binary logic network to respond to a predetermined sequence of binary bits, $a(t)$, $b(t)$, $\ldots i(t) \ldots n(t) \ldots w(t)$ such that $b(t)=a(t+t_1)$, $\ldots i(t)=a(t+t_i)$, $n(t)=a(t+t_n)$, $\ldots w(t)=a(t+t_w)$, where $t_1 \ldots t_i \ldots t_n \ldots t_w$ indicate bit positions removed from $a(t)$, said sequence being such that the binary value of $w(t)$ in the majority for several repetitions of any particular $a(t)$, $b(t) \ldots n(t)$ is the actual desired response of the network for the particular values of $a(t)$, $b(t)$, $\ldots n(t)$ and that a majority of one binary value of $w(t)$ always exists, comprising $n$ input terminals, where $n$ is greater than one, a shift register responsive to all the bits in said sequence, said shift register having $n$ output terminals for simultaneously coupling a different one of $a(t)$, $b(t) \ldots n(t)$ to each of said $n$ input terminals, means responsive to the bits at said input terminals for deriving signals indicative of the canonical products thereof, switch means responsive to said signals indicative of said canonical products for passage or blockage thereof according to whether said switch means are closed or open, and means for controlling the opening and closing said switch means in response to a comparison between the output of said switch means and $w(t)$.

5. Apparatus for synthesizing a binary logical function in a trainable network responsive to a predetermined sequence of binary bits, $a(t)$, $b(t)$, $\ldots i(t) \ldots n(t) \ldots w(t)$ such that $b(t)=a(t+t_1)$, $\ldots i(t)=a(t+t_i)$, $n(t)=a(t+t_n) \ldots w(t)=a(t+t_w)$, where $t_1 \ldots t_i \ldots t_n \ldots t_w$ indicate bit positions removed from $a(t)$, said sequence being such that the binary value of $w(t)$ in the majority for several repetitions of any particular $a(t)$, $b(t) \ldots n(t)$ is the actual desired response of the network for the particular values of $a(t)$, $b(t) \ldots n(t)$ and that a majority of $w(t)$ always exists over said several repetitions, comprising $n$ input terminals each for sequentially receiving all the bits in said sequence, where $n$ is greater than one, means for simultaneously applying $a(t)$, $b(t) \ldots n(t)$ to respective ones of said $n$ input terminals during a given interval of time, means responsive to the bits at said input terminals for deriving signals indicative of the canonical products thereof, switch means for selectively gating said canonical product-indicative signals, means responsive to the signals gated by said switch means for forming therefrom a binary logical function, and means responsive to identity of binary value of the logical function formed by the last-named means and of the bit $w(t)$ for selectively reestablishing the operation of said switch means leading the formation of that logical function and responsive to lack of identity of binary value thereof for selectively changing the operation of said switch means leading to that logical function formation.

6. Apparatus for training a binary logic network located at a first site removed from a command site, said network having $n$ input terminals and comprising means at the command site for deriving a sequence of binary bits, means responsive to said sequence for transmitting the sequence to said first site, means for receiving the sequence at said first site and sequentially applying each bit thereof to said $n$ input terminals, said network including means for deriving the minterm products of the binary signals at said input terminals, switch means having a plurality of operating states constituting levels of probability of being open or closed to signal applied thereto and responsive to said minterm products for selective gating thereof in accordance with the present operating state of the respective switch means, means responsive to a comparison of the binary value of the output deriving from said switch means and of a bit in preselected position in said sequence for controlling the operating state of said switch means.

7. Apparatus for training a binary logic network located at a first site removed from a command site, said network having $n$ input terminals, comprising means at the command site for deriving plural sequences of binary bits, means selectively responsive to one of said sequences for transmitting the selected sequence to said first site, means for receiving the selected sequence at said first site and sequentially applying each bit thereof to said $n$ input terminals, said network including means for deriving the minterm products of the bits applied at said input terminals, switch means having a plurality of operating states representing levels of probability of being open or closed to signal applied thereto and responsive to said minterm products for selective gating thereof in accordance with the operating state of said switch means, and means responsive to a comparison of the binary value of the signal deriving from said switch means and of a bit in said selected sequence for controlling the operating state of said switch means.

8. Apparatus for training a binary logic network to form a desired logical function in response to a sequence of binary bits having a repeated consecutive order of binary values interspersed therein to $n$ input terminals of said network, where $n$ is an integer greater than one equal to the number of bits in said repeated consecutive order, said apparatus comprising means responsive to said sequence for sequentially applying each bit thereof to said $n$ input terminals, said network including means for deriving the minterm products of the binary signals at said input terminals, switch means responsive to said minterm products for selective passage thereof, and means responsive to a comparison of the binary value of the logical function deriving from the selected operation of said switch means, and of a bit in preselected position following each repetition of said consecutive order of binary values in said sequence for controlling the operation of said switch means.

9. In a system having a network adaptive to form selected logical functions of a plurality of binary input variables in response to training signals representative of the immediately preceding response of the network, for organization of the network toward a desired objective, the improvement comprising means for remotely changing the logical function to be formed by said network, said means including a transmitting station remote from said network for selectively transmitting any one of a plurality of distinct and different binary digital sequences for application as said binary input variables to said network, each of said sequences having a prescribed order of binary digits representative of a different logical function of the number of input variables to which said network is capable of responding at any given instant of time, and means responsive to the logical function formed by said network in response to a combination of said number of consecutive binary digits in an applied sequence and to the next successive binary digit in said applied sequence for training said network to form the last-named logical function each time the same order of values of said number of said consecutive binary digits in said applied sequence is repeated and is followed by a binary digit having a value corresponding to that value in the majority over the entire sequence for the bit position following each such repetition.

10. The invention according to claim 9 wherein is provided a shift register for response to an incoming binary digital sequence to apply said number of said consecutive bits as an input combination to said network.

11. The invention according to claim 10 wherein is provided further sources of binary input variables, and switch means for concurrently disconnecting said network from said shift register and from said means for training and connecting said network to said further sources for receipt of binary input variables therefrom.

12. A system for controlling the logical function of binary input variables which may be formed by a trainable logical network in response to training signals from a goal circuit having a fixed goal function, comprising means for selectively and repetitively applying as said binary input variables to said network any one of a plurality of different bit sequences representative of respective desired logical functions, each of said bit sequences containing as a repeated portion thereof a preselected order of binary values in consecutive bit positions equal in number to the number of binary input variables to which said network is capable of responding in any given instant of time and wherein a preselected bit position following each repetition of said order of binary values in a sequence has a majority of one binary value or the other, means responsive to the logical output function generated by said network and to the bit in said bit position following said order of binary values from which the last-named logical output function is derived for supplying training signals to said network in accordance with identity or lack of identity therebetween; said network including switch means for selectively passing or blocking bits derived from said binary input variables, means for applying said training signals to said switch means to control the passing or blocking of said derived bits, and means for combining bits received from said switch means to form a logical function, whereby said network is trained to form a logical function in accordance with which of the binary values in said bit position is in the majority.

13. The invention according to claim 12 wherein is provided means for selectively supplying unknown bit sequences to said network in place of said logical function-representative sequences after said network has been trained, and means simultaneously operable with the last-named means for decoupling said training signal supply means from said network.

14. A system for deriving binary sequences to control the functions of a logic network having $n$ inputs, $a(t)$, $b(t) \ldots n(t)$, where $n$ is an integer greater than one, which network derives the binary minterm products of its inputs and selectively gates them to a common terminal and includes means for rewarding those gates that respond to the minterm products to produce the desired function and for punishing those gates that respond to the minterm products to produce a function contrary to the desired function said system comprising means for generating a plurality of predetermined binary sequences, each of said sequences being adapted to elicit a respective response from said network to by which there is formed a distinct and different logical function, means for sequentially supplying the bits of one of said sequences to the input terminals of said network, each of said sequences being arranged such that $b(t)=a(t+t_1) \ldots n(t)=a(t+t_n) \ldots w(t)=a(t+t_w)$, where $t_1 \ldots t_n \ldots t_w$ are bit positions removed from $a(t)$ and $w(t)$ is the desired network response for any particular $a(t)$, $b(t)$ . . . $n(t)$, the binary value of $w(t)$ in the majority following several repetitions of any particular $a(t)$, $b(t)$ . . . $n(t)$ is the actual desired network response for those particular $a(t)$, $b(t)$ . . . $n(t)$ and a majority one of binary value of $w(t)$ always exists in a sequence, and means for selectively controlling which one of said sequences is to be supplied to said network.

References Cited

UNITED STATES PATENTS

| | | | |
|---|---|---|---|
| 2,979,565 | 4/1961 | Zarcone | 178—50 |
| 3,237,170 | 2/1966 | Blasbalg et al. | 340—172.5 |
| 3,262,101 | 7/1966 | Halpern | 340—172.5 |

ROBERT C. BAILEY, *Primary Examiner.*

R. RICKERT, *Assistant Examiner.*